(12) United States Patent
Marstorp et al.

(10) Patent No.: US 7,735,514 B2
(45) Date of Patent: Jun. 15, 2010

(54) APPARATUS FOR REGULATING FLOW OF A MEDIUM IN A HEATING AND COOLING SYSTEM

(75) Inventors: Leif Marstorp, Ljung (SE); Björn Holmgren, Ulricehamn (SE)

(73) Assignee: Tour & Andersson AB, Ljung (SE)

( * ) Notice: Subject to any disclaimer, the term of this patent is extended or adjusted under 35 U.S.C. 154(b) by 462 days.

(21) Appl. No.: 11/662,699

(22) PCT Filed: Jul. 7, 2005

(86) PCT No.: PCT/SE2005/001122

§ 371 (c)(1),
(2), (4) Date: Mar. 13, 2007

(87) PCT Pub. No.: WO2006/031161

PCT Pub. Date: Mar. 23, 2006

(65) Prior Publication Data

US 2007/0262279 A1 Nov. 15, 2007

(30) Foreign Application Priority Data

Sep. 15, 2004 (SE) .................................... 0402206

(51) Int. Cl.
*G05D 7/01* (2006.01)
(52) U.S. Cl. ...................... 137/501; 137/637.4; 251/212
(58) Field of Classification Search .................. 137/501, 137/614.17, 636.4, 637.4; 251/212
See application file for complete search history.

(56) References Cited

U.S. PATENT DOCUMENTS

| | | | | | |
|---|---|---|---|---|---|
| 2,341,411 | A | * | 2/1944 | Ojalvo | 137/614.17 |
| 2,582,370 | A | * | 1/1952 | Albrecht | 137/637.4 |
| 2,986,161 | A | * | 5/1961 | Renick | 137/501 |
| 4,074,693 | A | * | 2/1978 | Kates | 137/501 |
| 4,624,281 | A | * | 11/1986 | Vidal et al. | 137/614.17 |
| 4,644,971 | A | * | 2/1987 | Vick | 137/625.64 |
| 5,566,711 | A | * | 10/1996 | Glansk et al. | 137/557 |
| 5,806,558 | A | * | 9/1998 | Greverath | 137/501 |
| 6,196,259 | B1 | | 3/2001 | Weber | |
| 6,230,734 | B1 | * | 5/2001 | Grebnev et al. | 137/501 |
| 6,688,319 | B2 | | 2/2004 | Trantham et al. | |
| 7,621,461 | B2 | | 11/2009 | Trantham et al. | |
| 2002/0084068 | A1 | | 7/2002 | Hugger | |

FOREIGN PATENT DOCUMENTS

| | | |
|---|---|---|
| DE | 27 56 118 | 6/1979 |
| EP | 0 591 873 | 4/1994 |
| SE | 8600679-8 | 8/1987 |
| SE | 524 737 | 9/2004 |
| WO | WO 94/21949 | 9/1994 |
| WO | WO 01/94818 | 12/2001 |
| WO | WO 03/065141 | 8/2003 |

* cited by examiner

*Primary Examiner*—Stephen Hepperle
(74) *Attorney, Agent, or Firm*—Davis & Bujold, P.L.L.C.

(57) ABSTRACT

The description relates to a device for the regulation of the amount of a medium in a heating or cooling system, comprising a combined valve, which in one and the same valve housing includes one part for pressure difference regulation (2) and one part for flow limitation (3), the flow being limited in a stepless, adjustable way, i.e. the device obtaining an adjustable Kvs-value. Also, the chosen Kvs-value can be limited by a plunger, which always can operate with its complete stroke length.

9 Claims, 6 Drawing Sheets

APPARATUS FOR REGULATING FLOW OF A MEDIUM IN A HEATING AND COOLING SYSTEM

This application is a national stage completion of PCT/SE2005/001122 filed Jul. 7, 2005 which claims priority from Swedish Application Serial No. 0402206-7 filed Sep. 15, 2004.

FIELD OF THE INVENTION

The present invention relates to a device for the regulation of the amount of a flow, having an adjustable Kvs-value, in a heating and cooling system.

BACKGROUND OF THE INVENTION

The object of a device according to the present invention is to keep the flow constant by combining a pressure difference valve with an integrated check device. The check device can also be varied by choosing in a stepless manner a more or less open check device in order to in this way in the separate case let the desired flow reach a chosen pressure difference level.

The already known devices, designed to meet these objects, and in these cases primarily pressure difference regulators or flow regulation valves, are impaired by various drawbacks.

A device, based on a pressure difference regulator, in principle can limit the flow to a level, which depends on the chosen pressure difference across the valve and the size of the valve, i.e. the flow, which it is chosen to be able to limit the pressure for. The limitation is caused by the fact, that, when a smaller flow is needed, a flow, which is smaller than the predicted one, to the valve, which is related to a definite pressure difference, must be added a valve, which eliminates this too large flow. In this case this separate valve can be allowed to operate with a pressure level, which may cause noise, since the chosen pressure difference valve cannot check this smaller flow and thus not limit the pressure for this smaller flow. Consequently, two different valves must be combined. One pressure difference valve and one flow regulating valve in order to obtain the desirable regulation functioning is of course an expensive solution.

A device, based on a flow regulation valve, can of course limit the flow, but such a system must include valves, which also limit the available pressure difference across the flow limitation valve. This means, that regardless of what system of the two mentioned above, which is chosen, the set-up must comprise at least two separate units, one which limits the pressure difference level and one which regulates the flow.

In small set-ups, e.g. in small houses, the pressure levels are normally not so high, that the above-mentioned combination of difference- and flow limitation functions are required. In these set-ups radiator valves are used, which can be designed to allow the opening between the cone and the seat of the valve to vary in various ways in order to be able to regulate the flow in a better way.

Examples of solutions for small set-ups are described in SE 8600679-8 and in DE 27 56 118.

For large set-ups, i.e. often set-ups with high pressure differences, there are constructions, which are based on a limitation of the flow in steps, which arrangement is described in e.g. EP 0 591 873 A 1, and as an alternative a use of a pressure difference valve according to e.g. U.S. Pat. No. 6,196,259 B1.

In all these existing solutions the total cost is high, in case a satisfactory functioning in a set-up is to be achieved, partly because several units are required and partly because the existing pressure difference valves often are complicated constructions. Since at least one pressure reducing function and one flow limiting function are required, in most set-ups, the final cost for the client will be high. Two components must be installed and these often require some type of maintenance or control, which means elevated costs.

SUMMARY OF THE INVENTION

The object of the present invention is to counteract and as far as possible eliminate the above-mentioned problem. Also, the invention is to develop the art in this field in various respects. The object of the invention particularly is to develop a complete valve, which can be used during changing operation conditions.

These objects are achieved according to the present invention by means of a device of the type described in the Summary of the Invention.

BRIEF DESCRIPTION OF THE DRAWINGS

Additional characterizing features and advantages of the invention are set forth in the following description, reference being made to the enclosed drawings in which:

FIG. 3a shown in a fully open position;

DETAILED DESCRIPTION OF THE INVENTION

Figure 1:
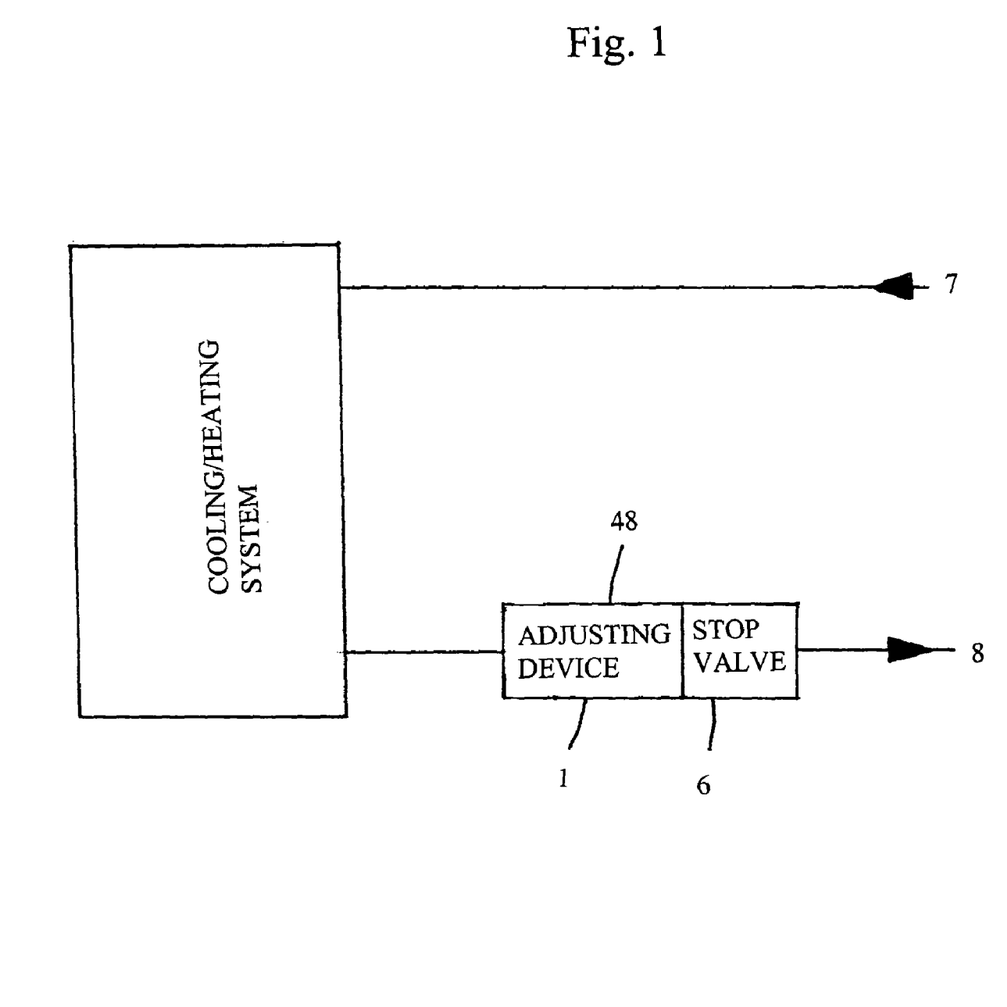
FIG. 1 is a schematic diagram of a device according to the present invention, being a part of a cooling or heating set-up or plant, the flow regulation valve according to the invention being integrated with an inlet or an outlet line.
Figure 2:
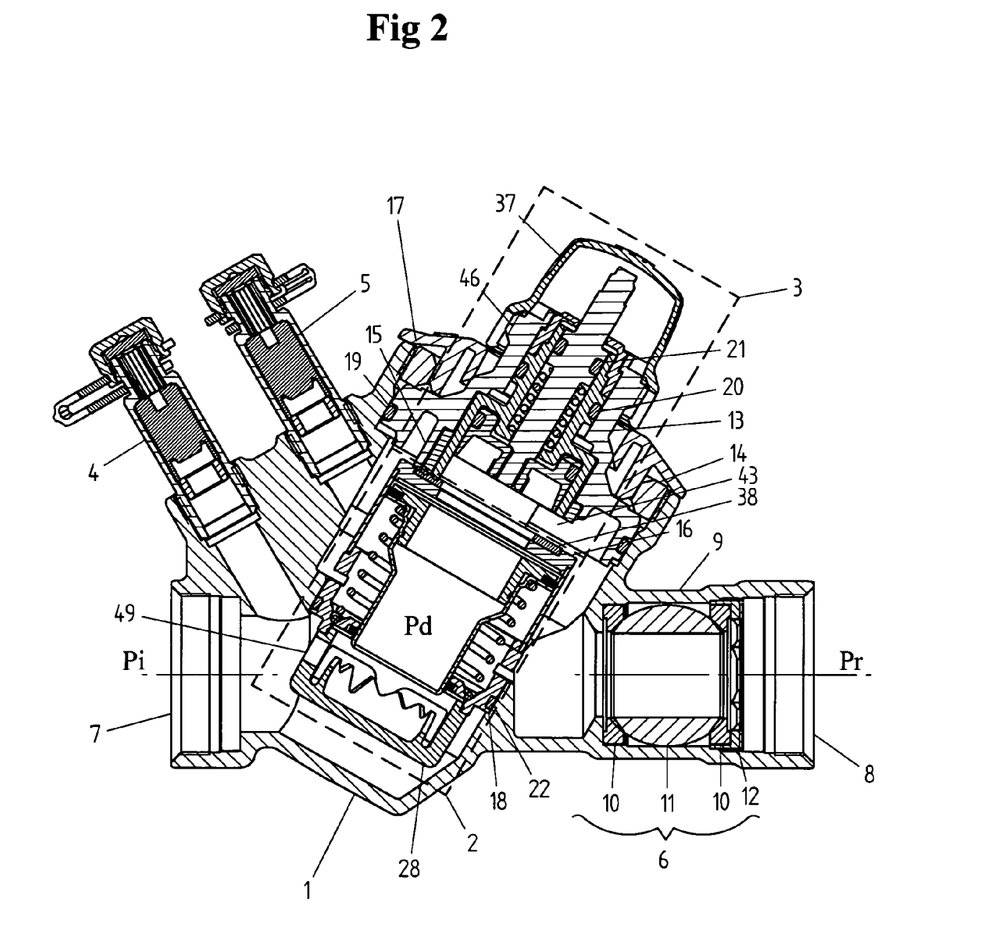
FIG. 2 is a cutaway view of the valve according to the invention.

FIG. 2 shows the complete flow regulating valve 1, which comprises a connection 7 for the flow pipe and a connection 8 for the return flow pipe. The valve is provided with measuring outlets to be able to control the actual total drop of pressure across pressure difference part 2 and flow regulating valve part 3. In connection 4 the pressure in the flow pipe can be measured/registered as can the pressure in the return flow pipe in connection 5. The construction of the measuring nipples is known in the art. Examples regarding construction and operation are described in i.a. document SE 020 2851-2.

Also, the valve is provided with a stop valve 6, mounted in extended part 9 of return connection 8 of the valve. This stop valve can advantageously be a ball valve, in which is mounted with sealing elements 10 and a stop ball 11 and in which place these parts are fixed in an axial direction by means of a stop nut 12.

The regulating function of the complete valve consists of two interacting parts, which are mounted in the common valve housing 1. The upper part, which contains a flow regulating valve part 3, is mounted in the valve housing by fixing top piece 13 to housing 1 by threading a locking nut 14 on the top part of the housing 1 and the lower annular part 15 of the top piece 13 being pressed against gasket 38, which is inserted into cylinder head 16 of the pressure difference part, which in its turn presses pressure difference part 2 downwards against control plane 18 of valve housing 1. On upper, outer thread 46 of top piece 13 a protective cover 37 is suitably mounted, which after its installation can be replaced by a suitable type of adjusting means—not shown in the figure.

A sealing, in order to prevent outer leakage between the valve housing and the top piece is done by means of O-ring 19. In a similar way outer leakage via the inner components of flow regulating valve part 3 is prevented by the mounting of O-rings 20 and 21 respectively.

Figure 3A:
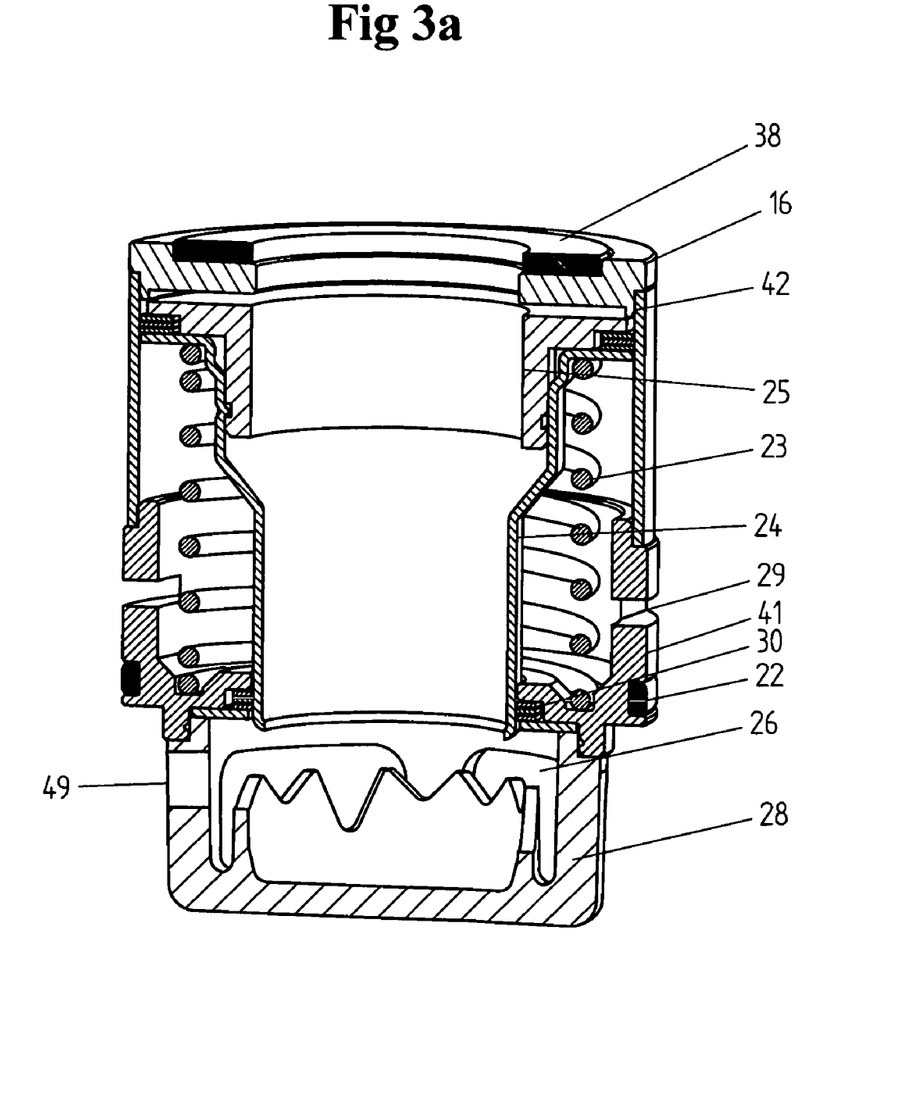
FIG. 3a is cutaway view of a pressure difference regulating part according to the invention.

The construction of the pressure difference part is shown in FIG. 3, FIG. 3a showing the pressure difference regulating part in its fully open position, i.e. when the spring force of spring 23 presses the cylindrical, basket-like part 24 with its upper sleeve-like part 25 upwards towards cylinder head 16 of the pressure difference part. In order to guarantee a small distance between sleeve-like part 25 and its upper side and the lower side of the cylinder head 16, the cylinder head is provided with a distance shoulder 42. This will enable the pressure level, which exists inside components 24 and 24—the pressure difference-part—having a pressure Pd—to act on as large a surface as possible. In this position, i.e. when the cylindrical basket-like part 24 is in its highest position, passage 26 is fully open between the lower, non movable check portion and the cylindrical basket-like part 24.

Figure 3B:
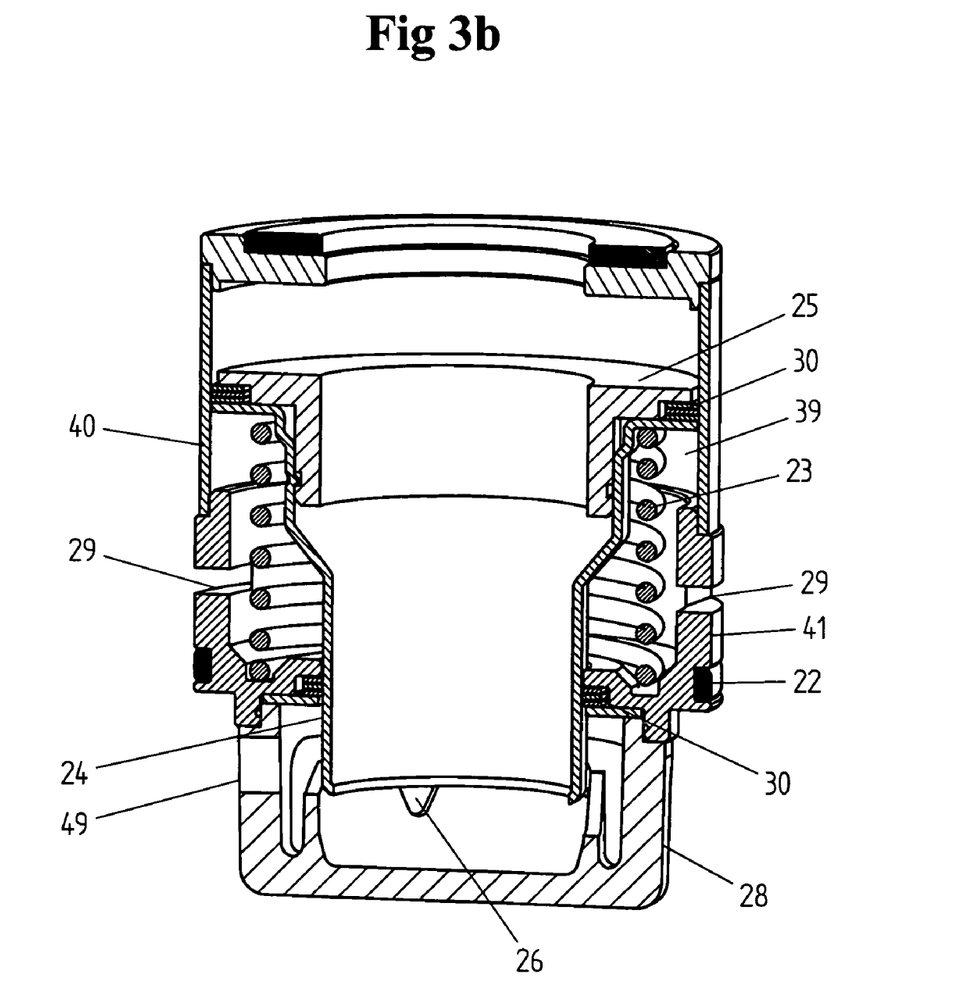
FIG. 3b is a cutaway view of a pressure difference regulator part according to the invention, showing a position, in which the passage is partially eliminated.

In FIG. 3b an operation position is shown, in which spring unit 23 partially has been compressed, passage 26 having been reduced in this way. This operation position is obtained, when the pressure level of inlet side 7, called Pi, is higher than pressure level Pd, which is obtained after passage 26 in a downstream direction.

Thus, when inlet pressure Pi increases, basket-like part 24 will be pressed downwards and will consequently restrict/reduce passage 26 and the result of this will be a pressure loss of from level Pi to level Pd. The pressure difference between Pd and the pressure level of outlet side 8, called Pr, is chosen to let the Pd-force times the upper surface of sleeve-like part 25 compress spring 23 into a position, in which the spring force jointly with the force, which pressure Pr times the surface, on which Pr acts in space 39 between basket-like part 24 and the inner diameter of the cylindrical casing, is balanced. Thus, the pressure difference between Pd and Pr is constant and not dependent on pressure level Pi of inlet side 7. This constant pressure difference is the basis of the operation of the flow regulating valve 3.

Thus, in case Pi increases, from the position shown in FIG. 3b, spring unit 23 will be compressed additionally and this will in its turn result in a reduction of passage 26, since the pressure difference between Pd and Pr must be kept constant. Pressure Pr enters into space 39 via slots 29, which are present in lower cylindrical casing ring 41. In order to prevent, that the higher pressure Pi will enter into this space 39, an O-ring 22 is provided, which seals between valve housing 1 and lower cylindrical casing part 41, and sealing rings 30 respectively, which seals between this cylindric casing part 41 and the cylindrical basket-like part 24. Also between cylindrical casing 40 and sleeve-like part 25 in the upper end of the pressure difference part there are sealing rings 30, designed to guarantee partly, that the higher pressure level Pi does not leak into space 39 and partly that sealing rings 30 are provided, designed to provide a low friction between components 24 and 28 and between components 25 and 40 respectively. Low friction is important in order to guarantee, that changes of the input static pressure quickly leads to a new operation position for the movable 24 flow checking part of the pressure difference regulating part.

Figure 4A:
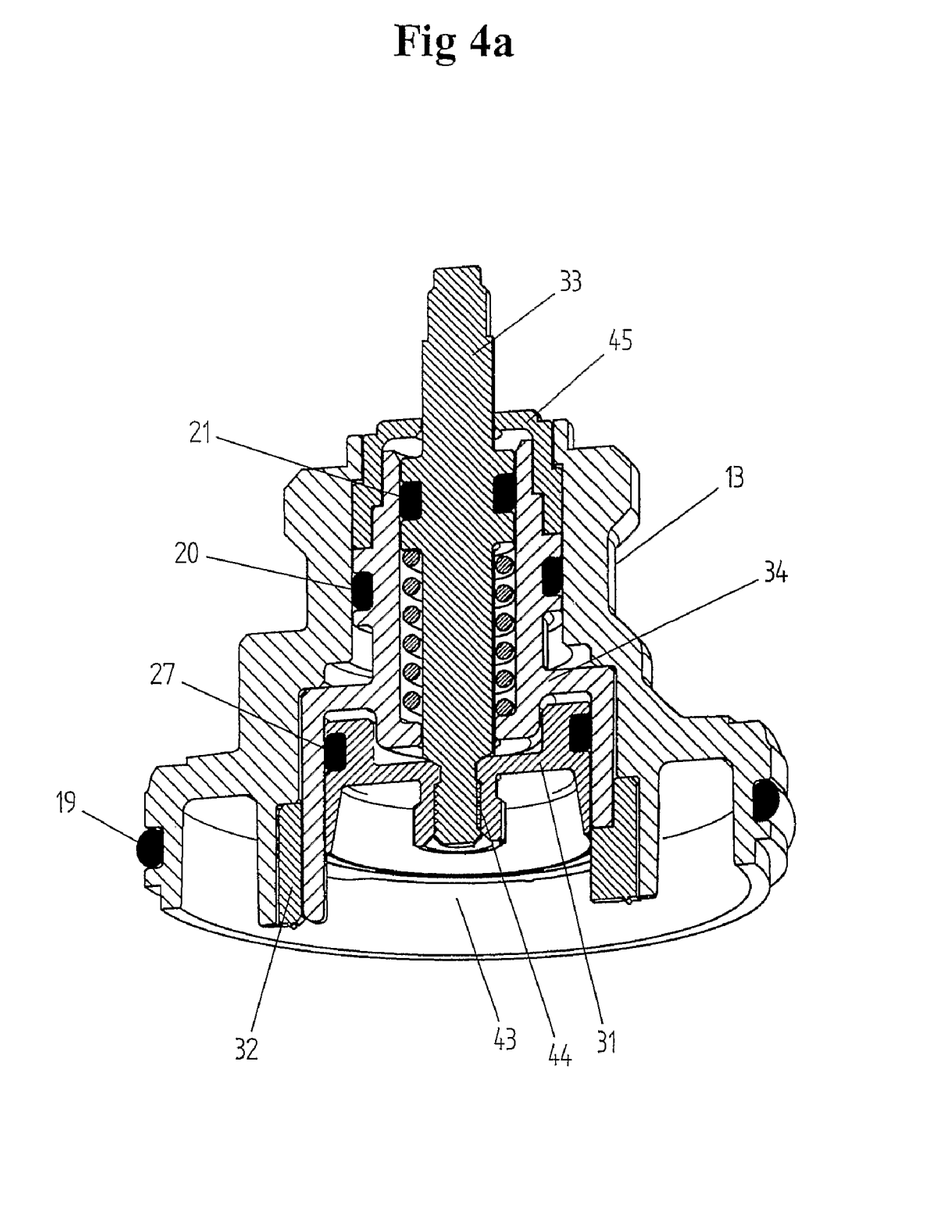
FIG. 4a is a flow regulating valve part according to the invention showing the valve fully open.

The construction of the flow regulating valve part 3 is shown in FIG. 4, which shows the flow regulating valve part 3 fully open, i.e. revolving rotary gate 34 has been rotated by turning the holding case 45 with a pre-adjustment 36—not shown in the Figs.—into a position, in which passage 43 outwards towards outlet side 8 of the valve is fully open, and simultaneously plunger 31 is positioned in its upper, open or highest position relative to the gasket 38 in the cylinder head 16 of the pressure difference regulating part 2.

The flow regulating valve part 3 will, due to its construction, always make it possible to choose an opening degree, which makes it possible to choose exactly the maximal flow, which is appropriate for the separate application case, and simultaneously it is possible to restrict this flow by means of the rotary movement of rotary gate 34.

The desired maximal flow is guaranteed thanks to the fact, that the pressure difference part always provides a constant difference of the pressure Pd—Pr, maximal drop of pressure, which the flow regulating valve part 3 must than take care of. With this drop of pressure as a starting point it is then possible to choose the flow, which the valve is to provide by rotating rotary gate 34 in a stepless manner, the chosen opening degree corresponding to the desired flow. The rotary gate 34 cooperates with fixed cylindrical valve seat 32, which is mounted into top piece 13. On top piece 13 it is advantageous to attach a graduated collar 17, according to FIG. 2, which interacts with a pre-adjustment tool—not shown in the drawings—which is used, when a position for rotary gate 34 is to be chosen in relation to cylindrical valve seat 32. Pre-adjustment tool gears with holding case 45, which in its turn rotates rotary gate 34.

Thus, through the described pre-adjustment it is possible to always dimension the opening degree of the valve, the so called Kvs-value, depending on the present need, and thus, it is not necessary to choose a valve having rigid steps between different openings degrees, different flows.

In addition to this function, the one with a stepplessly chosen KVS-value, it is also possible to restrict this flow by means of a plunger 31, which can be displaced in an axial direction by the spindle 33. The axial movement can always be utilized in its entire length, regardless of the opening degree, which has been chosen by means of rotary gate 34. This means, that it is really possible to regulate the flow, regardless of whether the valve/plunger is to restrict a small or a large flow.

When the plunger reaches its lowest position, i.e. when the valve is to stop the flow entirely, this has been secured by letting the plunger be lowered and sealed against rubber gasket 38, provided on top of cylinder head 16 of the pressure difference valve. In this position, when the plunger seals, pressure level Pi, present in the system, would press the cone upwards. By introducing a small slot 44 between spindle 33 and plunger 31 a small leakage flow up to the upper side of the plunger is permitted and in this way a decompression of the plunger is achieved and consequently the undesirable effect of a pressure/force increase on the plunger is prevented and in this way the sealing functioning is secured. The decompression also implies, that the closing per se can be accomplished through minor forces, and it will be easy to operate the valve.

The flow regulating valve part 3 is provided with O-rings 20 and 21 in order to prevent an outer leakage via the inner parts in top piece 13 and also an O-ring 27 in order to limit an inner leakage. O-ring 19 will prevent an outer leakage between top piece 13 and valve housing 1.

Figure 4B:
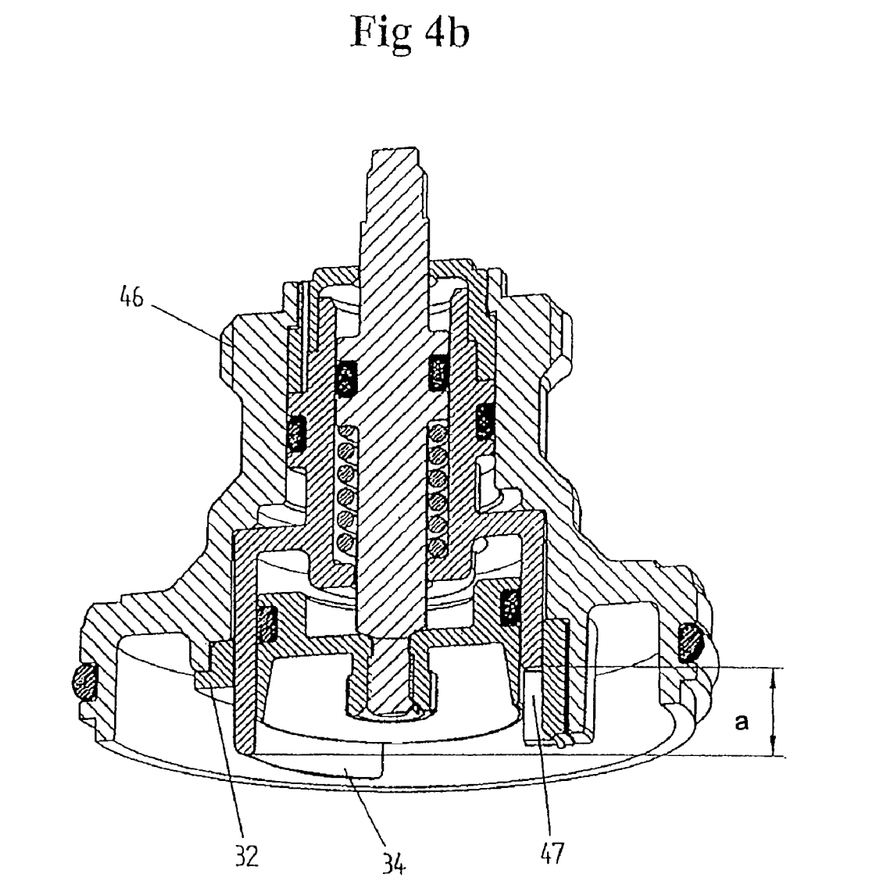
FIG. 4b is a flow regulating valve part according to the invention showing the valve with its cone partially closed.
Figure 4C:
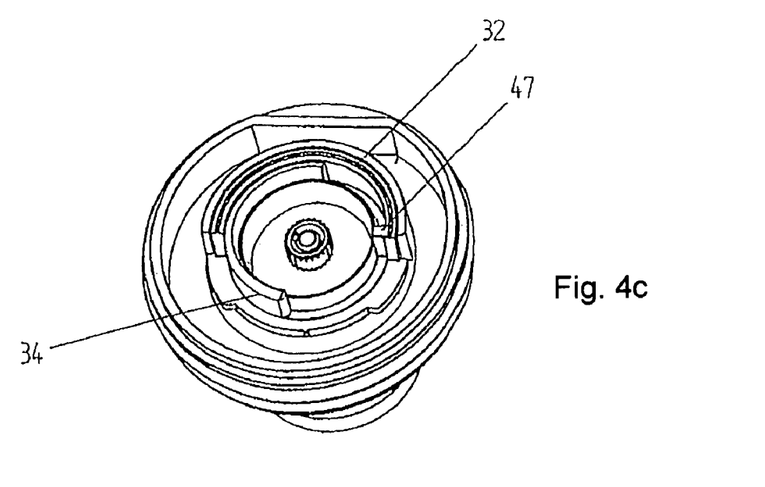
FIG. 4c is a bottom perspective view of the valve in which the stop shoulder for the check device if shown.

In FIGS. 4b and 4c, which shows the check valve from below, the flow regulating valve part 3 is seen in a position, where the opening degree of the flow regulating valve part 3 is limited to a certain extent. The rotary gate 34 has in this situation been rotated, the opening in relation to the cylindrical valve seat 32 having been reduced. Simultaneously this lateral view shows plunger 31 in a position, in which it has been removed downwards somewhat in relation to its upper position, its starting position. The rotary gate 34 can in principle be rotated 180° and in its final position, when the opening between the rotary gate and the fixed cylindrical valve seat 32 is completely closed, the rotary gate stops against an inner shoulder 47 on cylindrical valve seat 32. The valve seat 32 has also an opening, a recess (180°), which means, that the opening—when the valve is fully open—is a 180°—segment, the height of which is "a" according to the figure.

Of course, the solution described above for a device, designed for a flow regulation, can be modified to some extent within the scope of the inventive idea.

COMPONENT LIST

1=valve housing
2=pressure difference regulation part
3=flow regulating valve part
4=measuring nipple—Pi level
5=measuring nipple—Pr level
6=stop valve
7=flow pipe connection
8=flow pipe return connection
9=extended part of the valve housing
10=sealing element
11=stop ball
12=stop nut
13=top piece
14=locking nut
15=lower annular portion of the top piece
16=cylinder head of the pressure difference part
17=graduated collar
18=control plane of the valve housing
19, 20, 21, 22=O-rings
23=spring
24=cylindric basket-like part
25=sleeve-like part
26=passage
27=O-ring
28=lower, not movable check portion
29=slot
30=sealing ring
31=plunger
32=cylindrical valve seat
33=spindle
34=rotary gate
35=spring
37=protective cover
38=gasket
39=space
40=cylindrical casing
41=lower casing ring
42=distance shoulder
43=passage
44=slot for leakage flow
45=holding case
46=outer thread
47=shoulder
48=adjusting device
49=cut

The invention claimed is:

1. A device for regulating flow of a medium in either a heating or a cooling system, the device comprising:
a combined valve which, within a common valve housing (1), having one part for pressure difference regulation (2) and one part for flow limitation (3), the combined valve also comprising measuring nipples (4, 5) for measuring pressure levels and a stop valve function (6), a flow amount of the combined valve is regulated by a flow regulating valve part (3) in which the flow is restricted to a partial cylindrical opening formed by the combined action of a rotary gate (34) and an axial plunger (31) such that for any setting of the rotary gate (34) the axial plunger (31) controls a size of the opening and the flow rate in a linear fashion throughout an entire range of motion of the axial plunger (31); and
the pressure difference regulation part (2) and the flow regulating valve part (3) are both mounted in the valve housing (1) and are fixed in the valve housing (1) by a top piece (13) via a locking nut (14).

2. The device according to claim 1, wherein the flow limitation is done by the flow regulating valve part (3) which interacts with the pressure difference regulation part (2), and the flow regulating valve part (3) always operates with a total chosen differential pressure (Pd—Pr).

3. The device according to claim 1, wherein a seal between the pressure difference regulation part (2) and the flow regulating valve part (3) is done by pressing a lower annular part (15) of the top piece (13) against a gasket (38) in connection with the mounting of the locking nut (14).

4. The device according to claim 1, wherein the flow regulating valve part (3) obtains a steplessly adjustable passage (43) from a flow pipe connection (7) through a passage (26) to a flow pipe return (8) by rotating the rotary gate (34).

5. The device according to claim 4, wherein the rotary gate (34) interacts with a cylindrical valve seat (32).

6. The device according to claim 1, wherein the plunger (31) of the flow regulating valve part (3) always operates with all the stroke length regardless of an opening degree of the rotary gate (34).

7. A device for regulating flow of a medium in either a heating or a cooling system, the device comprising:
a combined valve which, within a common valve housing (1), having one part for pressure difference regulation (2) and one part for flow limitation (3), the combined valve also comprising measuring nipples (4, 5) for measuring pressure levels and a stop valve function (6), a flow amount of the combined valve is regulated by a flow regulating valve part (3) in which the flow is restricted to a partial cylindrical opening formed by the combined action of a rotary gate (34) and an axial plunger (31) such that for any setting of the rotary gate (34) the axial plunger (31) controls a size of the opening and the flow rate in a linear fashion throughout an entire range of motion of the axial plunger (31); and
the plunger (31) of the flow regulating valve part (3) in a closed position, when the plunger (31) seals against a gasket (38), is completely decompressed due to a leakage flow up to a top side of the plunger (31) via a slot (44) between a spindle (33) and the plunger (31).

8. The device according to claim 1, wherein the pressure difference regulation part (2) operates with a chosen pressure difference (Pd—Pr) which is kept almost constant irrespective of changes of a present static pressure-level (Pi).

9. A device for regulating flow of a medium in either a heating or a cooling system, the device comprising:

a combined valve which, within a common valve housing (1), comprises one pressure difference regulation part (2), one flow regulating valve part (3), measuring nipples (4, 5) for measuring pressure levels and a stop valve function (6), an amount of flow through the combined valve is regulated by a flow regulating valve part (3) which eliminates the amount flow in a stepless manner by a rotary gate (34), and the flow is limited by a plunger (31) which, in all chosen settings of the rotary gate (34), operates with a complete stroke length;

the pressure difference regulation part (2) and the flow regulating valve part (3) are both mounted in the valve housing (1) and are fixed in the valve housing (1) by a top piece (13) via a locking nut (14); and a seal between the pressure difference regulation part (2) and the flow regulating valve part (3) is done by pressing a lower annular part (15) of the top piece (13) against a gasket (38) in connection with the mounting of the locking nut (14).

\* \* \* \* \*